United States Patent [19]

Frisby et al.

[11] Patent Number: 4,887,931

[45] Date of Patent: Dec. 19, 1989

[54] METHOD AND APPARATUS FOR TOWING SUBSEA PIPELINE SECTIONS

[75] Inventors: Raymond A. Frisby, Houston, Tex.; George E. Conover, Carencro, La.

[73] Assignee: Baker Hughes Incorporated, Houston, Tex.

[21] Appl. No.: 313,994

[22] Filed: Feb. 16, 1989

[51] Int. Cl.⁴ .............................................. F16L 1/04
[52] U.S. Cl. ..................................... 405/171; 138/93; 405/158
[58] Field of Search .............. 405/154, 158, 166, 168, 405/169, 170, 171, 173; 138/89, 93

[56] References Cited

U.S. PATENT DOCUMENTS 3,136,133 6/1964 Perret .................................... 405/170
3,479,831 11/1969 Teague .................................. 405/170
4,011,620 3/1977 Southgate ........................ 405/171 X
4,377,354 3/1983 Morton ................................ 405/171

Primary Examiner—David H. Corbin

Attorney, Agent, or Firm—Hubbard, Thurman, Turner & Tucker

[57] ABSTRACT

A method and apparatus are provided for towing of a fluid containing tubular conduit above a sea bed floor and within a body of water, such as an ocean or river. First and second inflatable sealing elements are placed within the interior of the conduit with each of the sealing elements being movable from an unexpanded to an expanded position to effect a sealed interior section of the conduit. A movable pig is placed within the section and between the sealing elements and is activatable to displace fluid within the section when the sealing elements are in sealed relation to the conduit. A valve means is provided for discharge of the fluid out of the section during movement of the pig. A gaseous body is selectively injected through means, such as a valve, into the section to urge the pig into displacement motion whereby buoyancy may be provided through the section sufficient to raise and move the conduit above the sea bed floor while maintaining all of the conduit submerged within the body of water for towing purposes.

7 Claims, 2 Drawing Sheets

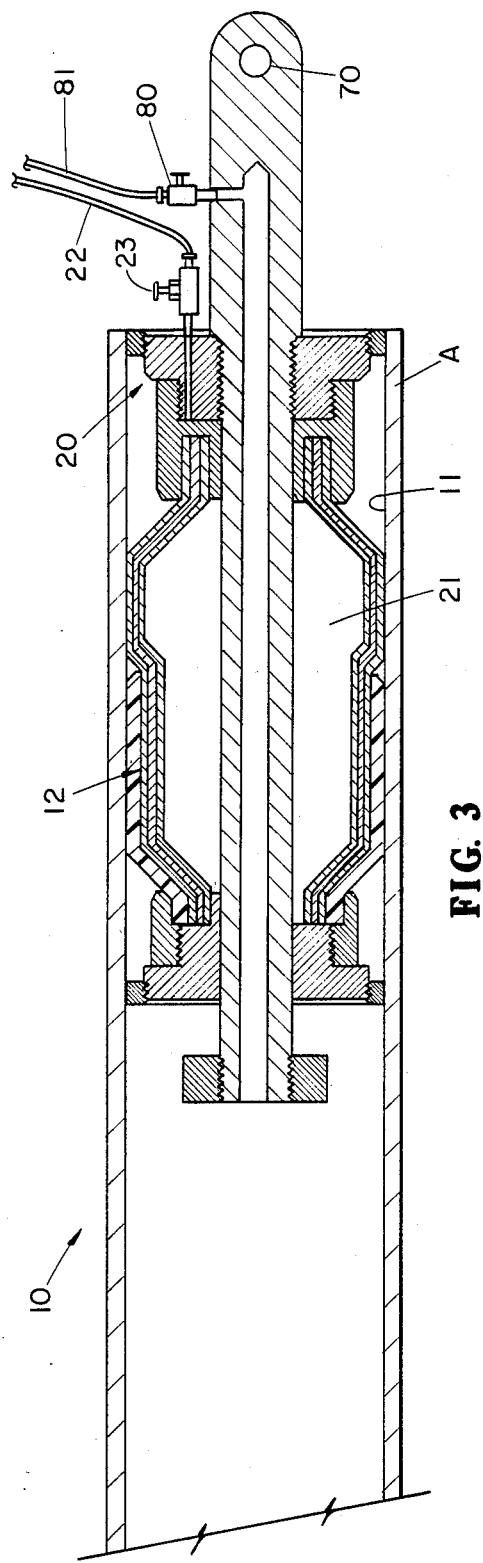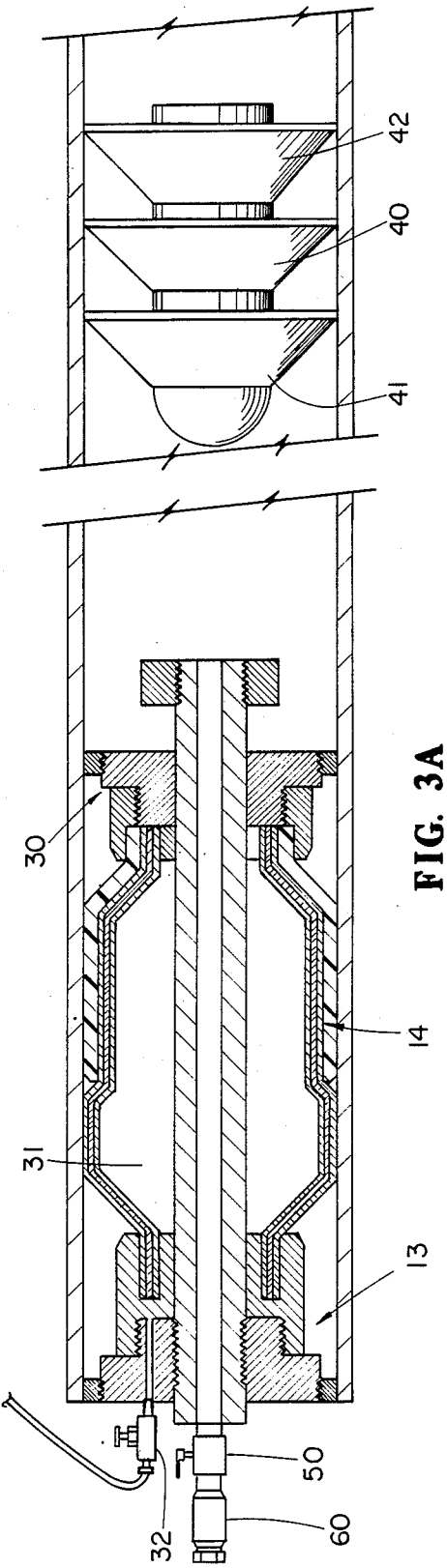
FIG. 3
FIG. 3A

METHOD AND APPARATUS FOR TOWING SUBSEA PIPELINE SECTIONS

BACKGROUND OF THE INVENTION

1. FIELD OF THE INVENTION

The invention relates to a method and apparatus for towing a pipeline, such as a gas transmission pipeline, by establishing sufficient buoyancy to raise the pipeline above the sea bed while maintaining it submerged within the body of water.

2. DESCRIPTION OF THE PRIOR ART

In offshore environments, such as the Gulf of Mexico, the North Sea, and in inland water bodies, such as rivers, canals and the like, there will be found submerged within the water extended lengths of tubing which is used to transmit chemicals, natural gas, produced hydrocarbons from offshore oil and gas wells, and other fluids from one location to another. Typically, such fluid transmission conduits, or pipelines, will be made up of a series of tubing sections which are threadably secured one to another and may be provided in lengths from a matter of 10 to 30 yards, up to a quarter mile in length, or more. When such tubing either breaks, or an abnormality or defect which adversely affects the integrity of the tubing occurs, it is necessary to move the tubing from the sea floor to a location for repair. In such instance, one or more towing vessels typically are used and are secured to the pipeline by means of a towing line. Of course, the drag on the vessel and the line caused by friction between the tubing and the floor of the sea causes considerable resistance and interference to the towing operation.

Sometimes gas pipeline transmission lines and the like are prepared in sections or lengths and such sections or lengths are towed to the position for offshore positioning on the sea bed floor. Again, the towing operation is greatly hampered if the tubing is required to be "dragged" along the sea bed floor.

Towing operations involving such tubing sections have incorporated the use of an inflatable-type sealing mechanism which is implaced within one end of the tubing to which is secured the tow line. The inflatable sealing element is inflated by air or other fluid and secures within the internal diameter of the towing end of the tubular conduit section. Still, such use of such inflatable sealing means has not been entirely satisfactory, because the tubing conduit continues to encounter considerable friction as a result of the drag upon it during the towing operation.

The present invention is an advancement in that it provides a means of towing such tubular conduits by eliminating the detrimental drag which previously resulted when the tubing section was dragged along the sea bed or other water channel floor. The present invention permits the tubing section which is towed to be placed into buoyancy such that there is no contact with the sea bed floor and, yet, the conduit still is maintained submerged within the water for ease of towing.

SUMMARY OF THE INVENTION

The present invention provides an apparatus and method for towing a fluid containing tubular conduit above a sea bed floor and within a body of water. The apparatus comprises first and second inflatable sealing means placed within the interior of the conduit at respective first and second locations therein with each of the sealing means being selectively movable from a first unexpanded position to a second expanded position whereby a sealed interior section of the conduit is defined when the sealing means are in the expanded position.

Pig means are movable within the section between first and second sealing means and are activatable to displace fluid within the section and out of the interior of the conduit when the first and second sealing means are in the second position. Valve means are communicably positioned relative to the interior of the section and are movable between open and closed positions for selective discharge of the fluid out of the section during movement of the pig means therethrough. Securing means are provided on one of the sealing means for affixation of a tow. Means are provided for selective injection of a gaseous body into the section to urge the pig means into displacement motion, whereby buoyancy is provided through the section sufficient to raise and move the conduit above the sea bed floor while maintaining all of the conduit submerged within the body of water.

BRIEF DESCRIPTION OF THE DRAWINGS

FIGS. 3 and 3A together constitute an enlarged sectional view of a pipeline section with the first and second inflatable sealing means being implaced therein in expanded position.

DESCRIPTION OF THE PREFERRED EMBODIMENTS

Figure 1:
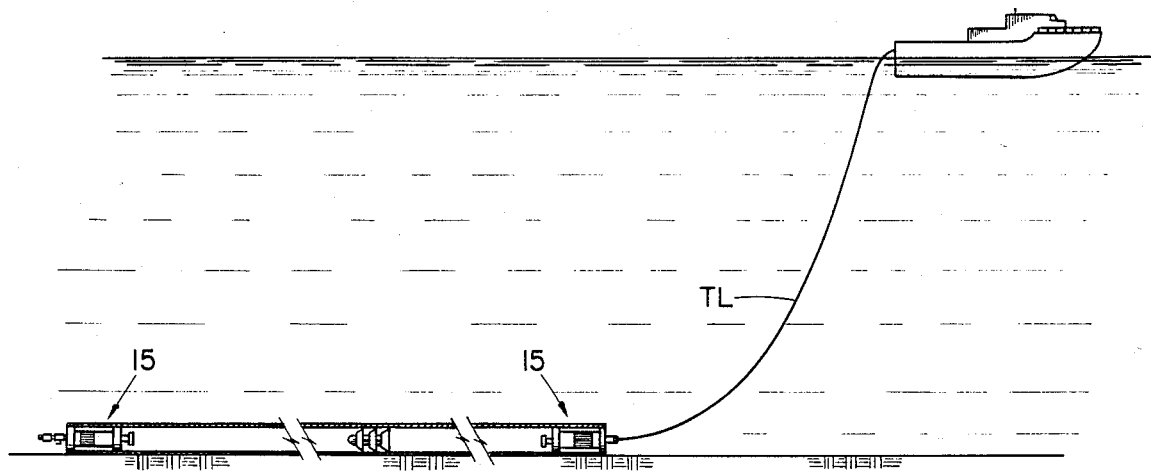
FIG. 1 is a schematic illustration of a typical pipeline tubular conduit positioned on a sea bed floor before a towing operation.

Turning first to FIGS. 3 and 3A, there is shown the apparatus 10 of the present invention. A first inflatable sealing means 20 is position at a first location 12 at the towing end of a conduit A and positioned within the interior 11 thereof. A second inflatable sealing means 30 is positioned within the interior 11 of the conduit at the opposite end 13 and, when moved from its first unexpanded position to the expanded position 15 (FIGS. 1 and 2), a sealed interior section 16 of the conduit 11 therebetween is provided.

Each of the first inflatable sealing means 20 and the second inflatable sealing means 30 are provided with seal elements 21 and 31, respectively. Those skilled in the art will recognize that a number of inflatable sealing means may be utilized such as those used and described in U.S. Pat. No. 4,349,204. The sealing means 20, 30 are placed within the conduit 11 at their respective locations 12, 13 when it is desired to place the pipeline in tow. The means 20, 30 are so positioned by means of a diver implacing such devices within the conduit at their desired positions 12, 13.

Prior to expansion of the sealing means 20, 30 and the placement of each of same within the conduit 11, a conventional pipeline pig means 40 is placed within one end of the conduit 11 and just slightly ahead of the first inflatable sealing means 20. Preferably, the pig means 40 will be placed into the conduit before placement of the first inflatable sealing means 20 therein. The pig means 40 may be placed into the conduit after placement of the second inflatable sealing means 30. The pig means 40 has first and second faces 41, 42, the face 41 facing the interior end of the first inflatable sealing means 20, and the face 42 facing the interior end of the second inflatable sealing means 30. The pig means 40 may have a construction well known to those skilled in the art and is intended to travel within the conduit to displace water or other liquid ahead of it and interfacing the face 42 thereof during the buoyancy establishment operation. Such pig means 40 are well known to those skilled in the art and may be obtained from a variety of commercial sources. For example, the pig means 40 may be provided in the form of a simple rubber ball, inflated ball-type tube, or may be provided in a more sophisticated nature with elastomer seal means, travel rollers, and the like.

Also as shown in FIGS. 3 and 3A, the second inflatable sealing means 30 contains at its outboard-most end a valve means 50 which, as shown, is reciprocated between open and closed positions by the hand of a diver. Of course, the valve means 50 may be provided in a more complex mechanical, hydraulic or electrical form with activation between open and closed positions occurring at the direction of and from the tow operator location, on the tow boat, or otherwise. When it is desired to discharge fluid within the conduit sealed interior section 16 after positioning the sealing means 20, 30, and movement of the pig means 40 from the towing sealing means 20 toward the second inflatable sealing means 30, the valve means 50 is reciprocated to open position by the diver, or otherwise. It is closed after discharge of sufficient fluid and the proper buoyancy is established.

The valve means 50 may take a variety of forms. It may be a flapper valve configuration, a ball valve, and its particular form and construction is not a part of this invention.

Also as shown in FIGS. 3 and 3A, a relief valve mechanism 60 is positioned outboard of the valve means 50 which is preselected to maintain a pre-determined amount of pressure within the sealed interior 16 to assure maintenance of buoyancy integrity by preventing ejection of fluid within the section 16 such that the conduit A would otherwise float to the top of the water.

Also, as shown in FIGS. 3 and 3A, a securing means 70 is provided at the outboard end of the first inflatable sealing means 20 for affixation of a tow line extending from the first inflatable sealing means 20 to the tow boat TB (FIG. 1) which has a tow line TL extending therefrom to the apparatus 10.

A gas injector 80 is provided in the form of a ball valve mechanism within the housing of the first inflatable sealing means 20 with an injection line 81 extending therefrom to the tow boat TB. Gas, such as air, is injected through the line 81 through the injector 80 and to the interior of the apparatus 10 to drive the pig means 40 away from the first inflatable sealing means 20 towards the second inflatable sealing means 30 to drive water within the sealed interior section 16 in front of the face 42 of the pig means 40 out of the second inflatable sealing means 30 through the valve means 50.

Each of the sealing means 20, 30, have inflation lines 22, 32 with respective needle valves 23, 33 thereon, through which inflation fluid is provided to move the sealing means 20, 30 from the first expanded position 14 to the second expanded position 15. Of course, the needle valves 23, 33, are valves used to prevent fluid from passing outwardly of the inflated elements into the lines 22, 32 subsequent to inflation of the means 20, 30.

Figure 2:
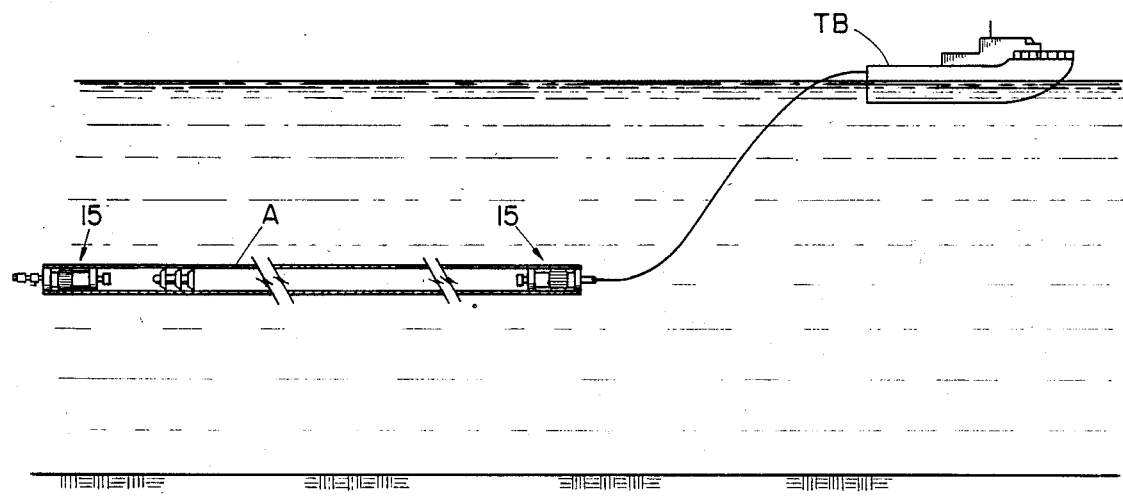
FIG. 2 is a view similar to that of FIG. 1 showing the tubular conduit pipeline in tow using the present invention with buoyancy being established to permit the conduit to be towed without drag on the sea floor bottom, yet with the pipeline still being submerged within the water body.

Now referring to FIG. 1, there is shown a schematic illustration of the tow boat TB with the tow line TL extending therefrom and into securement with the first inflatable sealing means 20. The pipeline conduit A is not yet in tow and buoyancy has yet to be established. After the first and second inflatable sealing means 20, 30 are placed within the interior of the conduit 11 and are moved from the first unexpanded position 14 to the second expanded position 15 to provide the sealed interior section 16 by introduction of gas within the line 81 and the injector 80, the pig means 40 is driven away from the first inflatable sealing means 20 toward the second inflatable sealing means 30. The valve means 50 has been manipulated from closed to open position for ejection of water from the interior of the section 16. After a pre-determined buoyancy has been established, which may be observed by the diver (or by known mechanical means), the valve means 50 is manipulated from open to closed position, and the conduit A now is in the position shown in FIG. 2 and is ready for transport in a satisfactory buoyancy-established position to the location for repair, or repositioning, or the like.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Apparatus for towing a fluid-containing tubular conduit above a sea bed floor and within a body of water, comprising:
   (1) first and second inflatable sealing means placed within the interior of said conduit at respective first and second locations therein, each of said sealing menas being selectively movable from a first unexpanded position to a second expanded position whereby a sealed interior section of said conduit is defined when said sealing means are in the expanded position;
   (2) pig means movable within said section between said first and second sealing means and activatable to displace fluid within said section and out of the interior of said conduit when said first and second sealing means are in said second position;
   (3) valve means communicably positioned relative to the interior of said section and movable between open and closed positions for selective discharge of said fluid out of said section during movement of said pig means therethrough;
   (4) securing means on one of said sealing means for affixation of a tow; and
   (5) means for selective injection of a gaseous body into said section to urge said pig means into displacement motion,
   whereby buoyancy may be provided through said section sufficient to raise and move said conduit above said sea bed floor while maintaining all of said conduit submerged within said body of water.

2. The apparatus of claim 1 further comprising conduit means extending from each of said inflatable sealing means to a source of inflation fluid for inflating said sealing means.

3. The apparatus of claim 1 further comprising conduit means extending from each of said inflatable sealing means to a source of inflation fluid for inflating said sealing means, and valve means in communication with said conduit means for permitting inflation fluid to pass in one direction through said conduit means to inflate said sealing means and for blocking return of said inflation fluid in the opposite direction and through said conduit means.

4. The apparatus of claim 1 wherein said means for selective injection of a gaseous body includes ball valve means positioned on one of said first and second inflatable sealing means and in communication with a source of said gaseous body.

5. The apparatus of claim 1 further comprising relief valve means in communication with said valve means communicably positioned relative to the interior of said section and outboard of said valve means to prevent discharge of said fluid in excess of a predeterminable amount for maintenance of sufficient pressure interior of said section to assure said buoyancy.

6. A method for towing a fluid-containing tubular conduit above a sea bed floor and within a body of water, comprising:
   (a) providing on said conduit a towing apparatus, said towing apparatus comprising:
      (1) first and second inflatable sealing means placed within the interior of said conduit at respective first and second locations therein, each of said sealing means being selectively movable from a first unexpanded position to a second expanded position whereby a sealed interior section of said conduit is defined when said sealing means are in the expanded position;
      (2) pig means movable within said section between said first and second sealing means and activatable to displace fluid within said section and out of the interior of said conduit when said first and second sealing means are in said second position;
      (3) valve means communicably positioned relative to the interior of said section and movable between open and closed positions for selective discharge of said fluid out of said section during movement of said pig means therethrough;
      (4) securing means on one of said sealing means for affixation of a tow; and
      (5) means for selective injection of a gaseous body into said section to urge said pig means into displacement motion;
   (b) moving each of said first and second inflatable sealing means from said first unexpanded position to said second expanded position;
   (c) introducing a gaseous body through said means for selective injection of the gaseous body into said section for urging of said pig means into displacement motion;
   (d) displacing fluid within said section and out of the interior of said conduit with said gaseous body as said pig means is moved within said section between said first and second sealing means; and
   (e) discharging said fluid out of said section during movement of said pig means therethrough and through said valve means communicably positioned relative to the interior of said section,
   whereby buoyancy is provided through said section sufficient to raise and move said conduit above said sea bed floor while maintaining all of said conduit submerged within said body of water.

7. A method for towing a fluid-containing tubular conduit above a sea bed floor and within a body of water, comprising:
   (a) providing on said conduit a towing apparatus, said towing apparatus comprising:
      (1) first and second inflatable sealing means placed within the interior of said conduit at respective first and second locations therein, each of said sealing menas being selectively movable from a first unexpanded position to a second expanded position whereby a sealed interior section of said conduit is defined when said sealing means are in the expanded position;
      (2) pig means movable within said section between said first and second sealing means and activatable to displace fluid within said section and out of the interior of said conduit when said first and second sealing means are in said second position;
      (3) valve means communicably positioned relative to the interior of said section and movable between open and closed positions for selective discharge of said fluid out of said section during movement of said pig means therethrough;
      (4) securing means on one of said sealing means for affixation of a tow; and
      (5) means for selective injection of a gaseous body into said section to urge said pig means into displacement motion;
   (b) moving each of said first and second inflatable sealing means from said first unexpanded position to said second expanded position;
   (c) introducing a gaseous body through said means for selective injection of the gaseous body into said section for urging of said pig means into displacement motion;
   (d) displacing fluid within said section and out of the interior of said conduit with said gaseous body as said pig means is moved within said section between said first and second sealing means; and
   (e) discharging said fluid out of said section during movement of said pig means therethrough and through said valve means communicably positioned relative to the interior of said section,
   whereby buoyancy is provided through said section sufficient to raise and move said conduit above said sea bed floor while maintaining all of said conduit submerged within said body of water; and
   (f) towing said conduit from a first location to a second location while said buoyancy is provided through said section.

\* \* \* \* \*